Jan. 10, 1961    C. G. SERIGHT    2,967,988
BATTERY CHARGING SYSTEM
Filed March 25, 1958
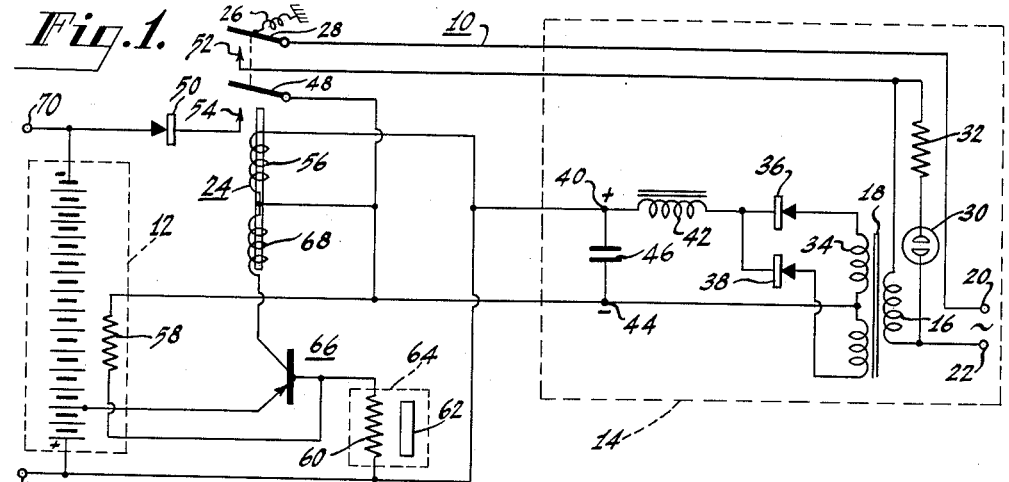
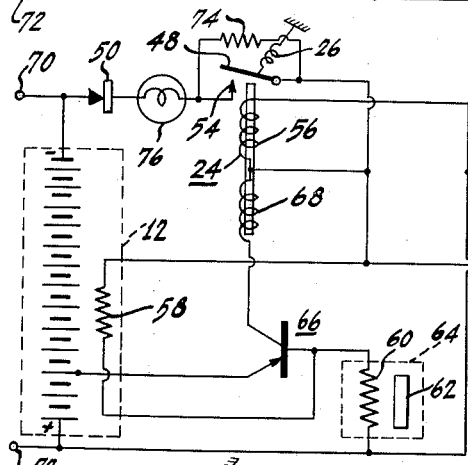
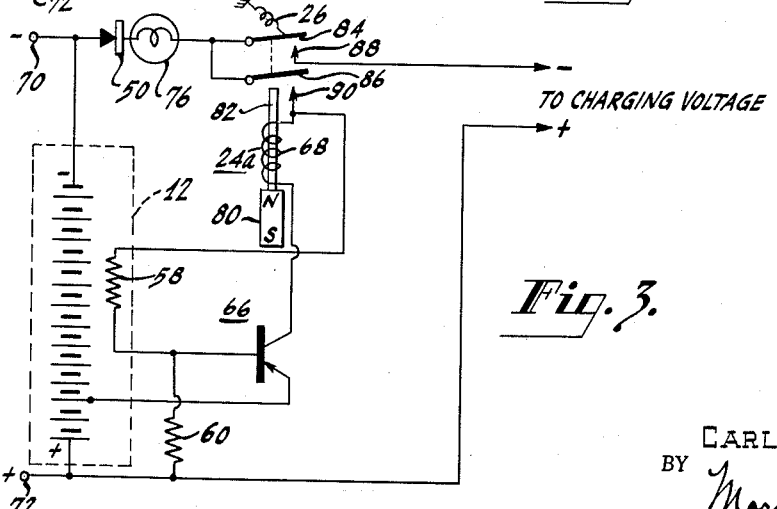
INVENTOR.
CARL G. SERIGHT
BY
ATTORNEY United States Patent Office 2,967,988
Patented Jan. 10, 1961

2,967,988

BATTERY CHARGING SYSTEM

Carl G. Seright, Trenton, N.J., assignor to Radio Corporation of America, a corporation of Delaware Filed Mar. 25, 1958, Ser. No. 723,872

11 Claims. (Cl. 320—36)

This invention relates to battery charging systems generally, and more particularly to systems for charging a secondary battery intended as a source of energy for portable electrical apparatus, such, for example, as a television receiver.

In many portable electrical and electronic appliances, a chargeable battery is used as the main source of electrical energy. On a portable transistorized television receiver, for example, a 12 volt nickel-cadmium battery may operate the receiver satisfactorily for only a few hours. At the end of this time the battery will have to be charged in order to provide continued operation.

It is desirable that the charging system for the battery should not require the continuous attendance of an operator in order to prevent overcharging. In some prior art battery charging systems it had been necessary to test the battery after a period of charging time to determine the degree of charge of the battery. A battery system that would obviate the necessity of such testing would, therefore, be very desirable.

Accordingly, it is an object of the present invention to provide an improved battery charging system that will automatically discontinue charging when the battery has become fully charged.

Another object of the present invention is to provide an improved battery charging system that can be left unattended, regardless of the initial state of the charge of the battery, without danger of harmfully overcharging the battery.

A further object of the present invention is to provide an improved battery charging system that will automatically disconnect the charger from the battery when the battery has become fully charged, and will thereafter provide a trickle charge to the battery.

Still a further object of the present invention is to provide an improved battery charging system that uses a heat sensitive impedance as a sensing element to indicate when the battery is fully charged, and that is relatively free from erroneous operation of the system under conditions of varying ambient temperature.

In accordance with the present invention, the foregoing objects and related advantages are attained through an improved battery charging system wherein a source of charging voltage is applied across the battery to be charged through a relay switch that is normally biased in an open position. The relay switch is provided with hold-in means to maintain the switch closed by a magnetic field polarized in one direction when the switch is closed manually. A voltage divider, comprising two serially connected heat sensitive impedances, is connected across the source of charging voltage. One of the heat sensitive impedances is intimately associated with the battery in a heat receiving relationship. The other heat sensitive impedance is provided with means to give it the same thermal lag as provided to the resistor in contact with the battery. A release winding of the relay is connected in a series circuit with the emitter-collector path of a transistor, and the latter circuit is connected between a voltage point on the battery and a voltage point of the source of charging voltage. The transistor is maintained in a cut-off biased state by connecting its base to the common junction of the serially connected heat sensitive impedances. When the battery has become fully charged, continued charging will heat the battery, and the heat sensitive impedance intimately associated with the battery will change its resistance and bias the transistor into a state of conduction. When this happens, current through the release winding will produce a magnetic field polarized in a direction to neutralize the magnetic hold-in means, and the relay switch will open automatically.

The relay switch may be shunted by a resistor that will limit the charging current to the battery to a trickle charge, if such a trickle charge is desired.

The novel features of the present invention, as well as the invention itself, both as to its organization and methods of operation, will be understood in detail when considered in connection with the accompanying drawing in which similar reference characters represent similar parts, and in which:

Fig. 1 is a schematic diagram of the battery charging system, in accordance with the present invention;

Fig. 2 is a schematic diagram of a modification of the battery charging system of the present invention adapted to provide a trickle charge to the battery when the battery has become fully charged; and Fig. 3 is another modification of the battery charging system of the present invention wherein a permanent magnet is used as hold-in means to maintain the relay switch in a closed position.

Referring, now, to Fig. 1, there is shown a battery charging system 10 for charging a battery 12 from a source 14 of charging voltage. The battery 12 may be any type of secondary battery capable of being recharged after it has become discharged.

The source 14 of charging voltage may be any source of unidirectional voltage of a higher voltage from that of the battery 12 to be charged. The source 14 of charging voltage, illustrated in Fig. 1, is obtained by the full wave rectification of an alternating current (A.-C.) voltage. A source of alternating voltage, from any suitable source, is applied across the primary winding 16 of a transformer 18 through input terminals 20 and 22 and a relay switch 24. The relay switch 24 is a double pole single throw switch that is normally biased in an open position, as by a spring 26. The terminal 20 is connected to an armature 28 of the relay switch 24.

A circuit, comprising a neon lamp 30 connected in series with a current limiting resistor 32, is connected across the primary winding 16 to indicate that an A.-C. voltage is applied across the primary winding 16 when the armature 28 of the relay 24 is in a closed position.

Each end of a center tapped secondary winding 34, of the transformer 18, is connected to the anodes of diodes 36 and 38 for full wave rectification of the transformed voltage across the secondary winding 34. The cathodes of the diodes 36 and 38 are connected to a positive output terminal 40 through a filter choke 42. The center tap of the secondary winding 34 is connected to a negative output terminal 44. A filter capacitor 46 is connected between the positive and negative output terminals 40 and 44 of the source 14 of charging voltage.

The positive output terminal 40 of the source 14 of charging voltage is applied to the positive terminal of the battery 12. The negative output terminal 44 of the source 14 of charging voltage is applied to the negative terminal of the battery 12 through an armature 48 of the relay switch 24, and through a unidirectional conducting device, such as a diode 50. The armatures 28 and 48 are linked together mechanically so that they may touch their respective contacts 52 and 54 when the relay switch 24 is in a closed position.

Means are provided to maintain the relay switch 24 in a closed position when the armatures 24 and 48 are depressed manually. To this end, a hold-in winding 56 of the relay switch 24 is connected across the positive and negative terminals 40 and 44 of the source 14 of voltage. The magnetic field produced by current through the hold-in coil 56 is sufficient to maintain the relay switch 24 closed, that is, to maintain the armatures 28 and 48 in contact with their respective contacts 52 and 54, when the armatures 28 and 48 have been manually depressed. It will now be understood that with the relay switch 24 in a closed position, the source 14 of charging voltage is applied across the battery 12 so that charging current may flow through the battery 12 in a direction to charge it.

The differential in voltage between the source 14 of charging voltage and the voltage of the battery 12 should be sufficient to charge the battery 12 as quickly as possible without damage to the battery 12. The source 14 of charging voltage may have any suitable current limiting means (not shown), well known in the art.

During the charging process, involving a chemical change within the battery 12, the charging current is used to produce this chemical change within the battery with little evolution of heat. When the battery 12 has become fully charged, however, the continued charging current will produce a rise in the temperature of the battery. This rise in temperature, indicating that the battery is now fully charged, may be sensed by a heat sensitive impedance, such as a sensing thermistor 58. The sensing thermistor 58 is intimately associated with the battery 12, as by being sandwiched between the cells of the battery 12, so that it is in a heat receiving relationship with the battery 12. The sensing thermistor 58 is connected in a series circuit with another heat sensitive impedance, such as a thermistor 60 exposed to the ambient temperature outside the battery 12. The thermistor 60 is used as a reference temperature resistor. The circuit comprising the serially connected sensing thermistor 58 and reference temperature thermistor 60 is connected across the source 14 of charging voltage.

The reference temperature thermistor 60 may be provided with a thermal lag to equal the thermal lag provided by the battery 12 to the sensing transistor 58. To this end, the thermistor 60 is placed in intimate heat receiving relationship with a thermal mass element, such as an iron element 62, and the thermistor 60 and element 62 may be wrapped with insulating material, such as kapok or cork, represented by the dashed rectangle 64 in the drawing.

When the battery 12 has become fully charged, as indicated by a difference in temperature between the sensing thermistor 58 and the reference temperature thermistor 60, the relay switch 24 should disconnect the source 14 of charging voltage from the battery 12 automatically. To this end, there is provided a PNP transistor 66 having an emitter electrode connected to the negative terminal 44 of the source 14 of charging voltage through a release winding 68 of the relay switch 24, and a base electrode connected to the common junction between the thermistors 58 and 60. The resistance values of the thermistors 58 and 60, and the voltage on the emitter of the transistor 66, are such as to maintain the transistor 66 biased to cut-off when the temperatures of the thermistors 58 and 60 are within a predetermined range of temperatures, say 5° centigrade. The transistor 66 may be made to conduct current when the voltage drop across the sensing thermistor changes, because of the rise in temperature of the battery 12, so as to cause the voltage at its base to be more negative than the voltage at the emitter.

The operation of the battery charging system 10, illustrated in Fig. 1, will now be described. To apply the source 14 of charging voltage to the battery 12, the relay switch 24 is closed, that is, the armatures 28 and 48 are depressed until they touch their respective contacts 52 and 54. The magnetic field provided by the hold-in winding 56 need only be great enough to hold the relay switch closed after the armatures 28 and 48 have been depressed. When the battery 12 has become fully charged, continued current from the source 14 of charging voltage will heat the battery 12. This action will cause the sensing transistor 58 to heat up and thereby decrease its resistance. The resistance of the reference temperature thermistor 60 will be determined by the ambient temperature. The difference in temperatures between the thermistors 58 and 60 will now be greater than a predetermined range of temperatures. Under these conditions the base electrode of the transistor 66 will become more negative with respect to the emitter electrode, and the transistor 66 will be made conductive.

Current will now flow through the transistor 66 and the release winding 68 in a direction so as to produce a magnetic field that is polarized in a direction opposite to the magnetic field produced by the hold-in winding 56. This action will cause the core of the relay switch 24 to be neutralized magnetically so that the armatures 28 and 48 will be pulled away from their respective contacts 52 and 54, by the action of the spring 26. The opening of the relay switch 24 disconnects a source 14 of charging voltage from the battery 12. The circuit in series with the primary winding 16 of the transformers 18 is also broken by this action, and the neon lamp 30 will be extinguished. This is an indication that the battery is fully charged and that the charger has been disconnected from the battery. The battery 12 is now ready to be utilized in a utilization circuit (not shown) that may be connected to the battery 12 through terminals 70 and 72.

The diode 50 is polarized in a direction to prevent current from flowing through the battery charging system if the relay switch 24 were to be closed accidentally when the charging circuit is not connected to a source of A.-C. voltage. The diode 50, for example, will prevent current from flowing from the battery 12 through the voltage divider comprising the thermistors 58 and 60, or through the hold-in winding 56, if the relay switch 24 were to be closed accidentally.

Referring, now, to Fig. 2, there is shown a modification in the battery charging system of Fig. 1 wherein the relay switch 24 comprises only a single pole single throw switch, and the relay switch 24 is shunted by a current limiting resistor 74. A lamp 76, for the purpose hereinafter appearing, is connected between the cathode of the diode 50 and the contact 54 of the relay switch 24. With the arrangement of the battery charging system of Fig. 2, it is possible to apply a small trickle charge to the battery after the battery has become fully charged.

The operation of the battery charging system illustrated in Fig. 2 will now be described. A source of A.-C. voltage is applied to the input teminals 20 and 22 of the source of charging voltage 14. The lamp 30 will light indicating that the source of A.-C. voltage has been applied. The armature 48 is depressed, against the tension of the spring 26, and held in a closed position by the magnetic field provided by the hold-in winding 56. When the battery 12 has become fully charged, the sensing thermistor 58 will have its resistance decreased with respect to the resistance of the reference temperature thermistor 60, due to the rise in temperature of the battery 12. The transistor 66, previously biased to cut-off, will now begin to conduct current, as explained for the battery charging system 10 of Fig. 1. Current through the release winding 68 will produce a magnetic field polarized in a direction opposite to that produced by the hold-in winding 56. This action will cause the relay switch 24 to open.

With the relay switch open, it will be seen that the source 14 of charging voltage is now connected across the battery 12 through the current limiting resistor 74. Under these conditions, a small trickle current is allowed to flow through the battery 12 so as to maintain it in a charged condition. The lamp 76 will burn brightly when the relay switch 24 is closed and the battery 12 is being charged. When the battery 12 is fully charged, and the relay switch is open, the lamp 76 will burn dimly indicating that the battery 12 is receiving a trickle charge.

Referring, now, to Fig. 3, there is shown another modification of the charging system of the present invention wherein the hold-in means for a relay switch 24a comprises a permanent magnet 80. The permanent magnet 80 is positioned with respect to the core 82 of the relay switch 24a to polarize it in one direction. The magnetic field so produced is sufficient to hold the relay switch 24a closed, that is, to hold the mechanically coupled armatures 84 and 86 in contact with the fixed contacts 88 and 90, respectively, when the armatures 84 and 86 are depressed manually.

The relay switch 24a is normally biased in an open position by the tension of the spring 26. The release winding coil 68 of the relay switch 24 is connected between the collector of the transistor 66 and the contact 90. The armatures 84 and 86 of the relay switch 24a are in the negative line between the source of charging voltage (not shown) and the lamp 76.

The operation of the battery charging system illustrated in Fig. 3 will now be described. The charging voltage is supplied to the battery 12 by manually closing relay switch 24a against the tension of the spring 26. The lamp 76 will now light indicating that the battery 12 is receiving a charge. When the battery 12 has become fully charged, continued charging raises the temperature of the battery. Under these conditions, the resistance of the sensing thermistor 58 decreases and causes the voltage at the base electrode of the transistor 66 to go negative with respect to the emitter electrode of the transistor 66. This action causes the normally cut-off transistor 66 to assume a conducting state. Current will now flow through the release winding 68 in a direction to cause a magnetic field in the core 82 that will neutralize the field produced by the permanent magnet 80. Under these conditions, the tension of the spring 26 will cause the relay switch 24a to open, and thereby disconnect the charging voltage from the battery 12. The lamp 76 will now be extinguished indicating that the battery 12 is fully charged and ready for utilization by a utilization circuit (not shown).

Though the thermal mass element 62 and insulation 64, shown and described in Fig. 1, has not been shown in Fig. 3, it will be understood that this structure can also be provided in this modification.

What is claimed is:

1. A charging system for charging a battery from a source of charging voltage comprising a relay switch, said battery having circuit connection terminals, said relay switch having circuit closing means, means including said relay switch to apply said source of charging voltage to said terminals of said battery for charging said battery, means to hold said circuit closing means of said relay switch closed following closure thereof, a pair of impedances, means connecting said impedances in series with each other and to said source of charging voltage, one of said impedances having a negative temperature coefficient of resistance and being connected in a heat receiving relationship with said battery, a transistor having an emitter, collector and a base, means connecting said base between said impedances, a release winding in said relay switch, and means connecting the emitter-collector path of said transistor and said release winding in series with each other and between a voltage point on said battery and a voltage point of said source of charging voltage whereby said transistor is biased to cut-off when said one impedance is within a predetermined temperature range with respect to the other impedance and whereby said transistor is made conductive when said one impedance is heated by said battery to a temperature outside of said temperature range.

2. A charging system for charging a battery from a source of charging voltage comprising a relay switch, means including said relay switch to apply said source of charging voltage across said battery for charging said battery, means to hold said relay switch closed by a magnetic field in one direction when said switch is closed, a pair of impedances, means connecting said impedances in series with each other and to said source of charging voltage, one of said impedances having a negative temperature coefficient of resistance and being connected in a heat receiving relationship with said battery, a transistor having an emitter, collector and a base, means connecting said base between said impedances, a release winding in said relay switch, means connecting the emitter-collector path of said transistor and said release winding in series with each other and between a voltage point on said battery and a voltage point of said source of charging voltage, said voltage points maintaining said transistor biased to cut-off only when said impedances are of substantially the same temperature, and said release winding being wound in a direction to produce a magnetic field in a direction opposite to said one direction when current flows through it whereby to neutralize said magnetic field in said one direction and to allow said relay switch to open.

3. A charging system for charging a battery from a source of charging voltage comprising a relay switch normally biased in an open position, means including said relay switch to apply said source of charging voltage across said battery for charging said battery, means to hold it closed by a magnetic field in one direction when said switch is closed, a pair of impedances, means connecting said impedances in series with each other, means to apply a voltage from said source of charging voltage across said serially connected impedances, one of said impedances being a thermistor and being connected in a heat receiving relationship with said battery, a transistor having an emitter, collector, and a base, means connecting said base between said impedances, a release winding in said relay switch, means connecting the emitter-collector path of said transistor and said release winding in series with each other and between a voltage point on said battery and a point of said source of charging voltage whereby said transistor is biased to cut-off only when said thermistor has a temperature within a predetermined range of the temperature of the other of said impedances, and said release winding being wound in a direction to produce a magnetic field in a direction opposite to said one direction when current flows through it whereby to neutralize said magnetic field in said one direction and to allow said relay switch to open.

4. A charging system for charging a battery from a source of charging voltage comprising, a relay switch normally biased in an open position, means including said relay switch to apply said source of charging voltage across said battery for charging said battery, means to hold said relay switch closed by a magnetic field in one direction when said switch is closed, a pair of thermistors, means connecting said thermistors in series with each other and to said source of charging voltage, one of said thermistors being connected in a heat receiving relationship with said battery, the other of said thermistors being exposed to the ambient temperature of said system, a transistor having an emitter, collector and a base, means connecting the common junction of said thermistors to said base, a release winding in said relay switch, means connecting the emitter-collector path of said transistor and said release winding in series with each other and between a voltage point on said battery and a voltage point of said source of charging voltage whereby said transistor is biased to cut-off only when said one thermistor has a temperature within a predetermined range of the temperature of said other of said thermistors, and said release winding being wound in a direction to produce a magnetic field in a direction opposite to said one direction when current flows through it whereby to neutralize said magnetic field in said one direction and to allow said relay switch to open.

5. Means to charge a battery from a source of charging voltage comprising a normally open relay switch having a core with a hold-in winding and a release winding wound thereabout, means connecting said hold-in winding across said source of charging voltage to provide said core with a magnetic field in one direction and to hold said switch in a closed position when said switch is closed, a pair of impedances connected in series with each other, means connecting said serially connected impedances to said source of charging voltage, a transistor having emitter, collector, and base electrodes, one of said impedances being a thermistor and being in a heat receiving relationship with said battery, means connecting the common junction of said serially connected impedances to said base electrode, means connecting the emitter-collector path of said transistor in a series circuit with said release winding, means connecting said last-mentioned circuit between a voltage point on said battery and a voltage point of said source of charging voltage, and said release winding being wound in a direction to provide a magnetic field opposite to said one direction when current flows through it whereby to substantially neutralize said core and to allow said relay switch to open.

6. Means to charge a battery from a source of charging voltage comprising a normally open relay switch having a core with a hold-in winding and a release winding wound thereabout, means connecting said hold-in winding across said source of charging voltage to provide said core with a magnetic field in one direction and to hold said switch in a closed position when said switch is closed, a pair of thermistors connected in series with each other, means connecting said serially connected thermistors to said source of charging voltage, a transistor having emitter, collector, and base electrodes, one of said thermistors being in a heat receiving relationship with said battery, means connecting the common junction of said serially connected thermistors to said base electrode, means connecting the emitter-collector path of said transistor in a series circuit with said release winding, and means connecting said last-mentioned circuit between a voltage point on said battery and a voltage point of said source of charging voltage to maintain said transistor biased to cut-off only when the temperature of one of said thermistors is within a predetermined range of the temperature of the other of said thermistors.

7. Means to charge a battery from a source of charging voltage comprising a normally open relay switch having a core with a hold-in winding and a release winding wound thereabout, means connecting said hold-in winding across said source of charging voltage to provide said core with a magnetic field in one direction and to hold said switch in a closed position when said switch is closed, a pair of thermistors connected in series with each other, means connecting said serially connected thermistors to said source of charging voltage, a transistor having emitter, collector, and base electrodes, one of said thermistors being in a heat receiving relationship with said battery, means connecting the common junction of said serially connected thermistors to said base electrode, means connecting the emitter-collector path of said transistor in a series circuit with said release winding, means connecting said last-mentioned circuit between a voltage point on said battery and said source of charging voltage, and heat conducting means in contact with the other of said thermistors to provide it with a thermal lag similar to that of said one thermistor when in contact with said battery.

8. In a battery charging system, for charging a battery from a source of charging voltage, a relay switch comprising a hold-in winding and a release winding, said relay switch being normally biased in an open position, means including said relay switch to apply said source of charging voltage across said battery to charge said battery, means connecting said hold-in winding across said source of charging voltage to magnetize said switch with a magnetic field in one direction and to hold it closed, a pair of heat sensitive resistors connected in series with each other, means connecting said serially connected resistors to said source of charging voltage, a transistor comprising emitter, collector, and base electrodes, means connecting said base electrode between said resistors, one of said resistors being a thermistor and being in a heat receiving relationship with said battery, means connecting the emitter-collector path of said transistor in a series circuit between a voltage point on said battery and a voltage point of said source of charging voltage, said release winding being wound in a direction to provide a magnetic field having a direction opposite to said one direction when current flows through it whereby to neutralize said one field and allow said relay switch to open, and said means to apply said source of charging voltage across said battery including an impedance connected across said relay switch.

9. In a battery charging system, for charging a battery from a source of charging voltage, a relay switch comprising a hold-in winding and a release winding, said relay switch being normally biased in an open position, means including said relay switch to apply said source of charging voltage across said battery to charge said battery, means connecting said hold-in winding across said source of charging voltage to magnetize said switch with a magnetic field in one direction and to hold it closed, a pair of thermistors connected in series with each other, means connecting said serially connected thermistors to said source of charging voltage, a transistor comprising emitter, collector, and base electrodes, means connecting said base electrode between said thermistors, one of said thermistors being in a heat receiving relationship with said battery, means connecting the emitter-collector path of said transistor in a series circuit between a voltage point on said battery and a voltage point of said source of charging voltage, said means to apply said source of charging voltage across said battery including an impedance connected across said relay switch, and means associated with the other of said thermistors to give it a thermal lag substantially equal to said one thermistor.

10. Circuit means for charging a battery from a source of charging voltage comprising a relay switch having a core, a release winding wound around said core, and a permanent magnet means positioned with respect to said core to magnetize said core with a magnetic field in one direction, said relay switch being normally biased in an open position and adapted to be held closed by said magnetic field in said one direction when said switch is closed manually, a pair of heat sensitive resistors connected in series with each other, means including said relay switch to connect said serially connected resistors to said source of charging voltage, one of said resistors being a thermistor in a heat receiving relationship with said battery, a transistor having emitter, collector, and base electrodes, means connecting the common junction of said serially connected resistors to said base electrode, means connecting said emitter-collector path of said transistor in series with said release winding and between a voltage point on said battery and said relay switch to maintain said transistor biased to cut-off only when the temperature of said one resistor is within a predetermined range of the temperature of the other of said resistors.

11. Circuit means for charging a battery from a source of charging voltage comprising a relay switch having a core, a release winding wound around said core, and a permanent magnet means positioned with respect to said core to magnetize said core with a magnetic field in one direction, said relay switch being normally biased in an open position and adapted to be held closed by said magnetic field in said one direction when said switch is closed manually, a pair of thermistors connected in series with each other, means including said relay switch to connect said serially connected thermistors across said source of charging voltage, one of said thermistors being in a heat receiving relationship with said battery, a transistor having emitter, collector, and base electrodes, means connecting said base electrode between said thermistors, means connecting said emitter-collector path of said transistor in series with said release winding and between a voltage point on said battery and said relay switch, and means associated with the other of said thermistors to maintain it at the ambient temperature of said circuit means and with a thermal lag approaching that of said one thermistor.

References Cited in the file of this patent

UNITED STATES PATENTS

| | | |
|---|---|---|
| 2,550,344 | Godshalk | Apr. 24, 1951 |
| 2,585,005 | Godshalk et al. | Feb. 12, 1952 |
| 2,802,980 | Lapuyade | Aug. 13, 1957 |